(12) United States Patent
Pulley et al.

(10) Patent No.: US 9,046,395 B2
(45) Date of Patent: Jun. 2, 2015

(54) VORTEX SHEDDING FLOW METER

(75) Inventors: Gregg Pulley, Berthoud, CO (US); Vaibhav Kulkarni, Columbus, IN (US)

(73) Assignee: Spirax Sarco, Inc., Blythewood, SC (US)

(*) Notice: Subject to any disclaimer, the term of this patent is extended or adjusted under 35 U.S.C. 154(b) by 96 days.

(21) Appl. No.: 13/416,048

(22) Filed: Mar. 9, 2012

(65) Prior Publication Data
US 2012/0325014 A1 Dec. 27, 2012

Related U.S. Application Data

(60) Provisional application No. 61/451,200, filed on Mar. 10, 2011.

(51) Int. Cl.
G01F 1/32 (2006.01)

(52) U.S. Cl.
CPC .................................. G01F 1/3263 (2013.01)

(58) Field of Classification Search
CPC .... G01F 1/3263; G01F 1/3209; G01F 1/3245; G01F 5/00; G01F 1/32; G01F 1/3218; G01P 5/01
USPC ......................................... 73/861.22, 861.21
See application file for complete search history.

(56) References Cited

U.S. PATENT DOCUMENTS

| | | | |
|---|---|---|---|
| 4,911,019 A | 3/1990 | Lew | |
| 5,123,285 A | 6/1992 | Lew | |
| 5,627,322 A | 5/1997 | Osterloh | |
| 5,736,647 A | 4/1998 | Matsubara et al. | |
| 5,739,626 A | 4/1998 | Kojima et al. | |
| 5,869,772 A | 2/1999 | Storer | |
| 5,913,247 A * | 6/1999 | Steuer | 73/861.22 |
| 6,220,103 B1 | 4/2001 | Miller et al. | |
| 6,276,218 B1 | 8/2001 | Waers | |
| 6,298,734 B1 | 10/2001 | Storer et al. | |
| 2009/0102326 A1 | 4/2009 | Chiba et al. | |

OTHER PUBLICATIONS

Wang Yue, et al., Crystal orientation dependence of piezoelectric properties in LiNbO3 and LiTaO3, Science Direct, Optical Materials 23 (2003) 403-408. www.elsevier.com/locate/optmat. 0925-3467/03/$—see front matter Copyright 2003 Published by Elsevier Science B.V. doi:10.1016/S0925-3467(02)00328-2.

* cited by examiner

*Primary Examiner* — Daniel S Larkin
*Assistant Examiner* — Jamar Ray
(74) *Attorney, Agent, or Firm* — Nelson Mullins Riley & Scarborough LLP

(57) ABSTRACT

The present invention relates in general to vortex shedding flow meters with enhanced sensitivity for sensing and measuring vortex frequencies.

4 Claims, 22 Drawing Sheets

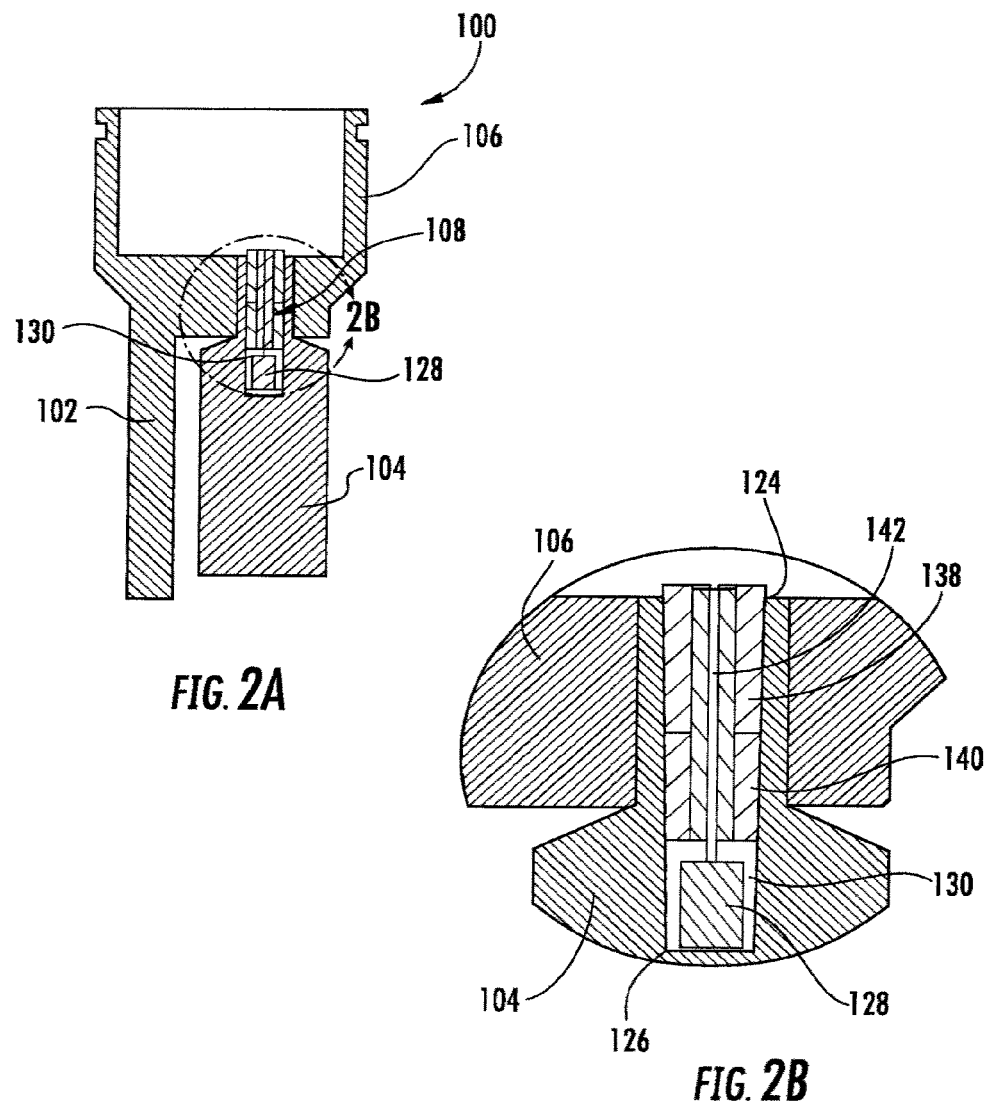

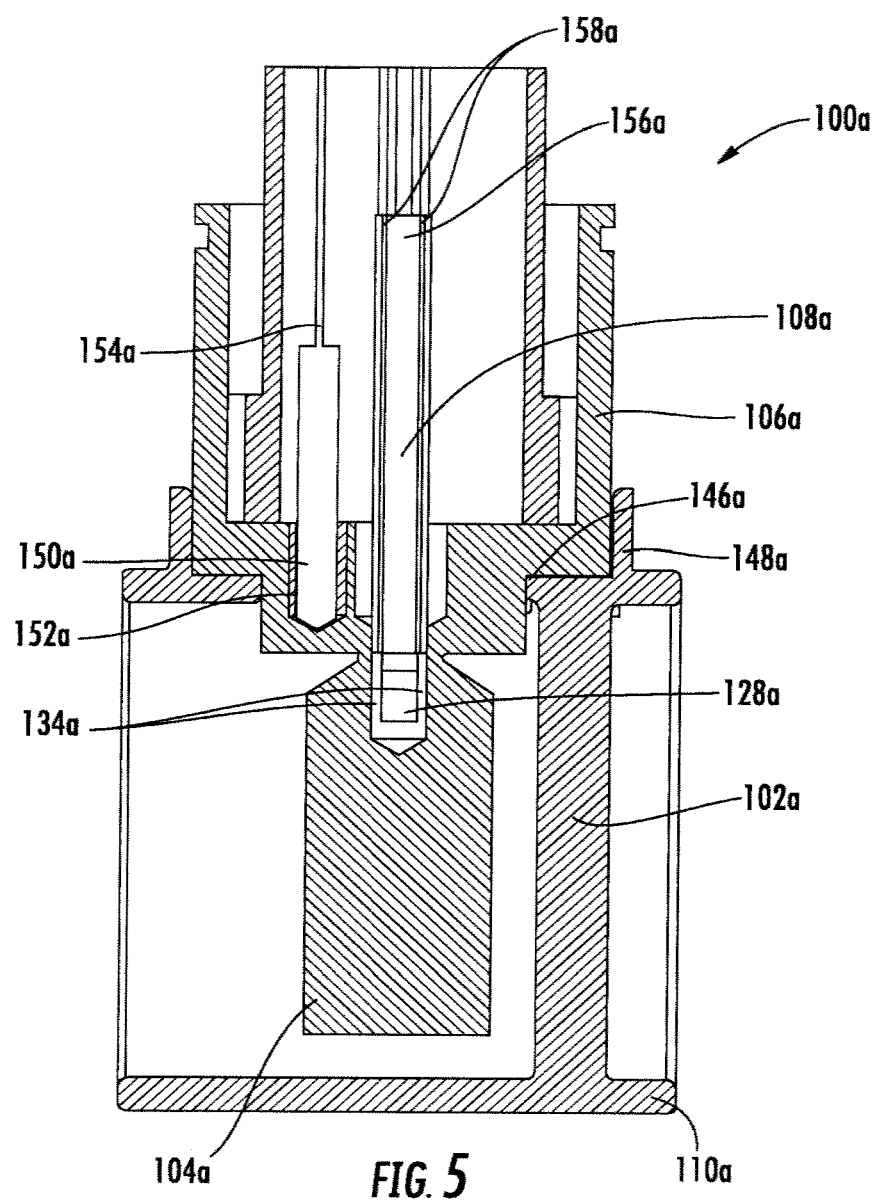

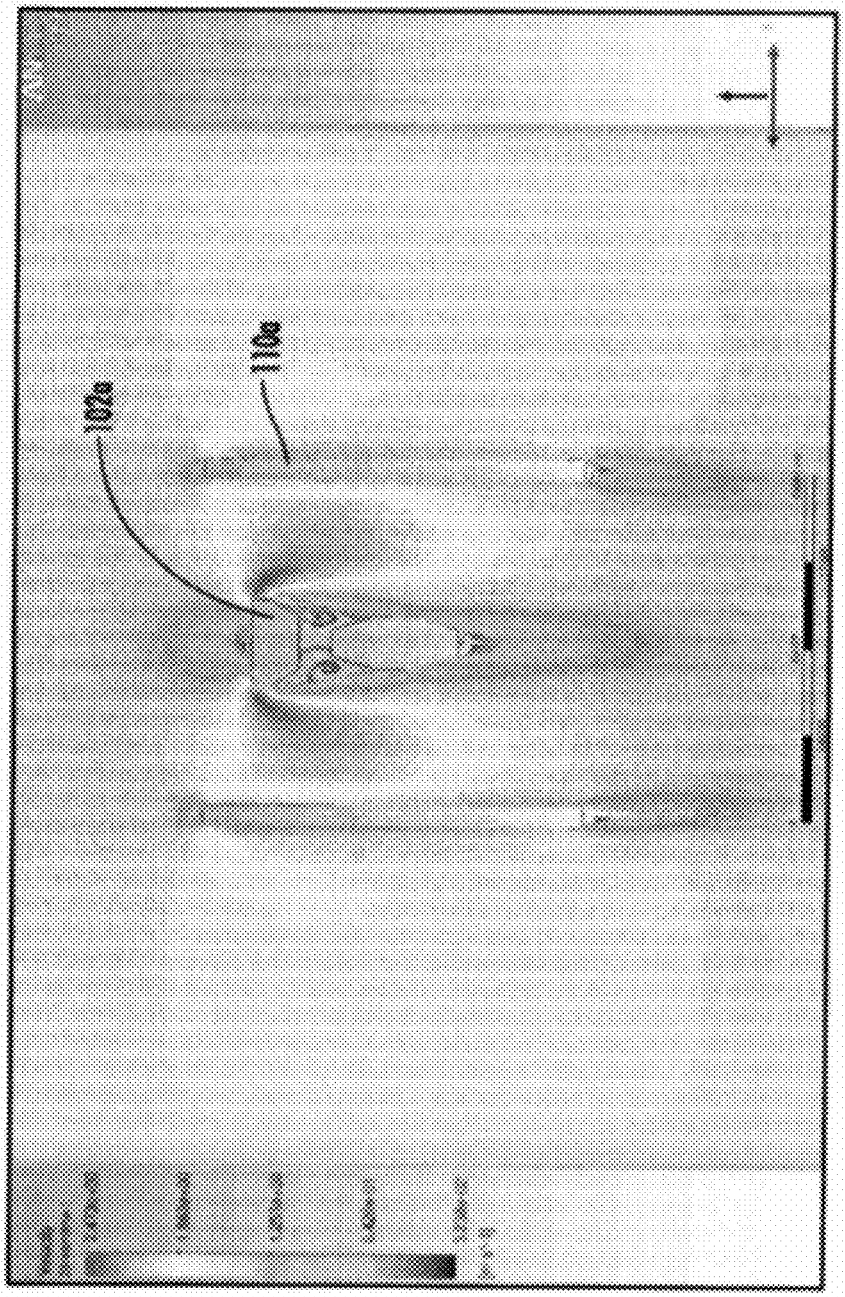

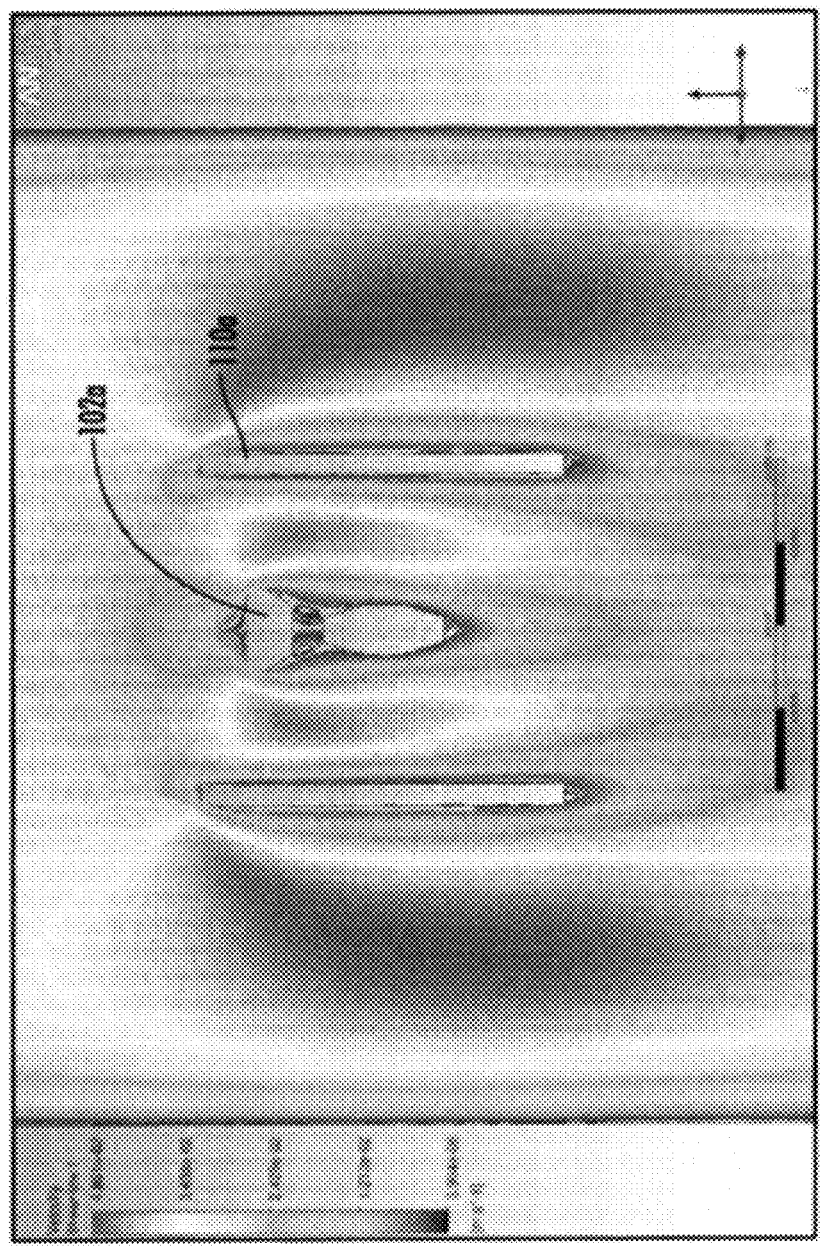

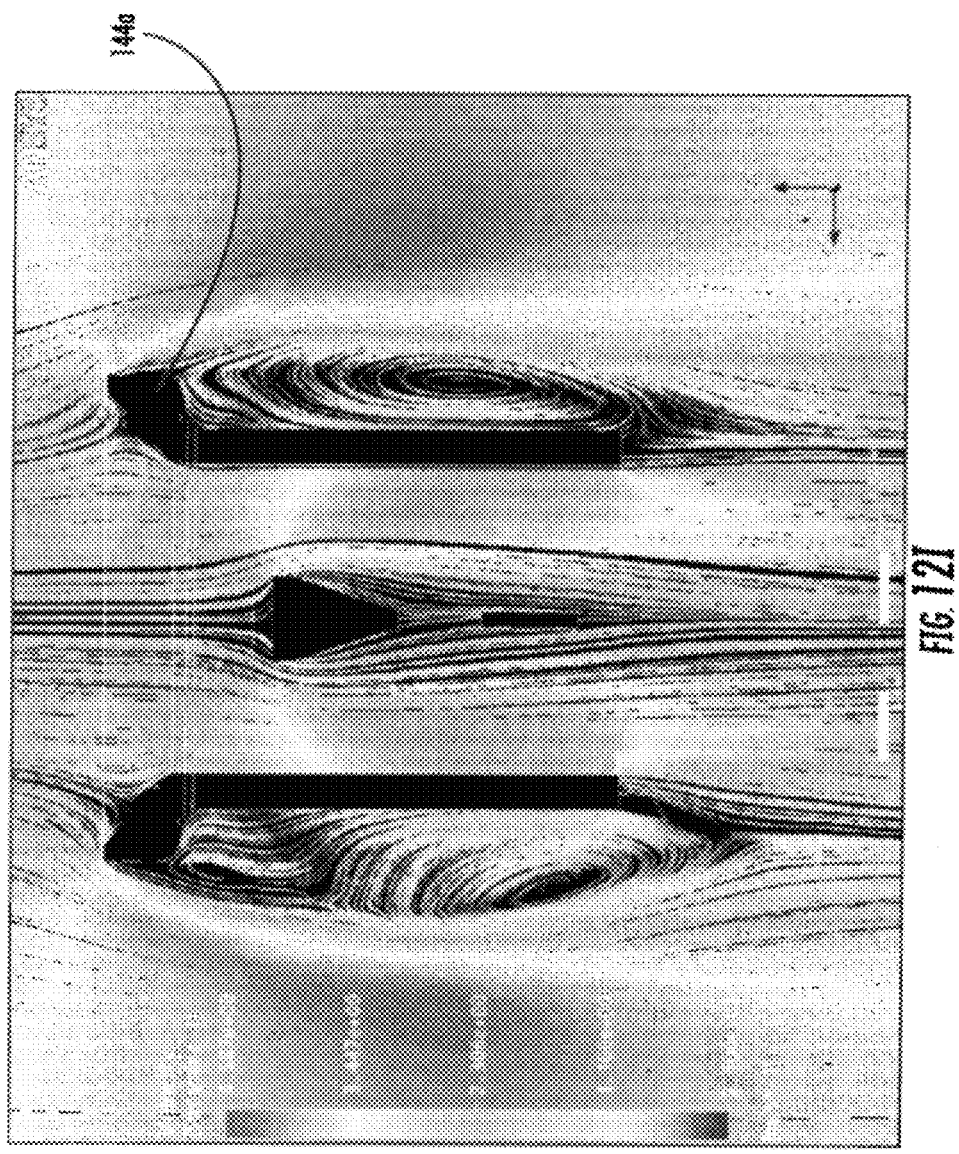

VORTEX SHEDDING FLOW METER

The present application claims priority to U.S. Provisional Patent Application Ser. No. 61/451,200, filed on Mar. 10, 2011 and incorporated herein by reference in its entirety.

FIELD OF THE INVENTION

The present invention relates in general to vortex shedding flow meters. In particular, the invention relates to an improved vortex shedding flow meter with enhanced sensitivity for sensing and measuring vortex frequencies.

BACKGROUND OF THE INVENTION

Vortex shedding flow meters have been used for many applications and are able to measure the flow rates of a variety of fluids, including steam, liquids, and gases. A vortex shedding flow meter operates on the principle that a bluff body, when placed in a moving fluid, produces an alternating series of vortices at a frequency that is directly related to the velocity of the moving fluid. Some vortex shedding flow meters detect the frequency of the shed vortices, thus the flow rates, by having a vane that is in communication with a piezoelectric material, positioned downstream from the bluff body. As the vortices pass over the vane, alternating lateral forces deflect the vane one way and then the other creating a surface charge about the piezoelectric material. The surface charge of the piezoelectric material is a function of the strain on the vane and therefore the velocity of the fluid may be measured.

Based on the design of current vortex shedding flow meters, however, the piezoelectric materials, are susceptible to producing charge not only when there is a deflection of the vane but also through turbulence and noise within the measured system, yaw (strain in the direction of the flow) due to drag, and vibrations.

There are a number of selection criteria for an appropriate piezoelectric material, including sensitivity, dynamic range, signal-to-noise ratio, temperature and cost. Sensitivity is directly related to the piezoelectric coefficient of the material. Dynamic range is a function of both sensitivity and mechanical robustness, meaning the material must generate a usable charge signal at low flow as well as remain mechanically sound at maximum strains, often a million times greater. Maximizing signal-to-noise requires that the piezoelectric material only respond to the specific mechanical strain vector being measured and reject all others. Further, bulk temperature and electromagnetic effects such as pyroelectric and ferromagnetic noise should preferably have little effect on the piezoelectric material. Accordingly, there are a number of factors that should be considered before an appropriate and effective piezoelectric material is found.

SUMMARY OF THE INVENTION

The present invention recognizes and addresses the foregoing considerations, and others, of prior art construction and methods.

According to an aspect, the present invention provides a vortex shedding flow meter. The flow meter includes a housing and a bluff body having a first side that makes initial contact with the flow of a fluid. The flow meter further includes a detector wing oriented in a cantilever manner from the housing and is positioned spaced apart from the bluff body in relation to the flow of the fluid. The detector wing has a channel within the wing. In this aspect, the channel further includes a Y-cut lithium niobate crystal to sense deflections of the detector wing and at least two electrodes that make contact with the Y-cut lithium niobate crystal and that extend through the channel to the housing.

According to another aspect, the present invention also provides a vortex shedding flow meter. The flow meter includes a housing and a hexagonal bluff body having a first side that makes initial contact with the flow of a fluid, the first side having a length at least two times the length of an opposite, parallel second side and at least five times the length of two adjacent perpendicular sides. The flow meter further includes an octagonal detector wing oriented in a cantilever manner from the housing and spaced apart from the bluff body in relation to the flow of the fluid. The detector wing further includes a first side proximate the bluff body with a length substantially equal to the length of an opposite parallel second side and substantially equal to the length of two perpendicular third sides.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 2A is a cross-sectional side view of a vortex shedding flow meter in accordance with an embodiment of the present invention;

FIG. 2B is an enlarged view of the portion indicated by circle 2B of FIG. 2A;

FIG. 5 is a partial cross-sectional view of a vortex shedding flow meter within a shroud in accordance with a second embodiment of the present invention;

FIG. 12D is a computational fluid dynamics model of a vortex shedding flow meter in accordance with a second embodiment of the present invention where water is passed at 5 ft/sec;

FIG. 12H is a computational fluid dynamics model of a vortex shedding flow meter in accordance with a second embodiment of the present invention where water is passed at 0.1 ft/sec;

FIG. 12I is a computational fluid dynamics model of a vortex shedding flow meter where a shroud having an obstruction is utilized;

Figure 1A:
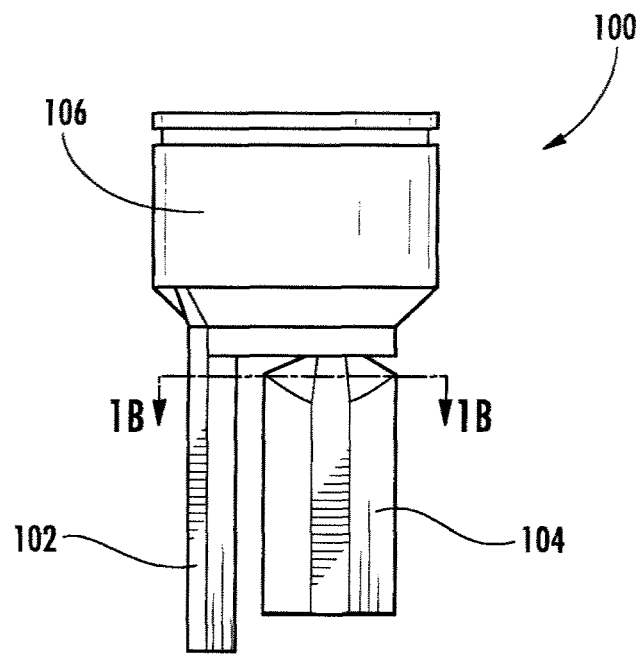
FIG. 1A is a side view of a vortex shedding flow meter in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

A vortex shedding flow meter 100 in accordance with an embodiment of the present invention is shown in FIG. 1A through FIG. 3. Flow meter 100 includes a bluff body 102 and a detector wing 104 that both extend in a cantilever manner from a housing 106. Detector wing 104 is fixedly attached to housing 106. As shown in FIGS. 2A and 2B, detector wing 104 further defines a channel 108 that extends upward into housing 106. Channel 108 may allow an operative connection between detector wing 104 and housing 106 such that generated vortices from bluff body 102 may be detected and measured, as more fully discussed below.

Figure 1B:
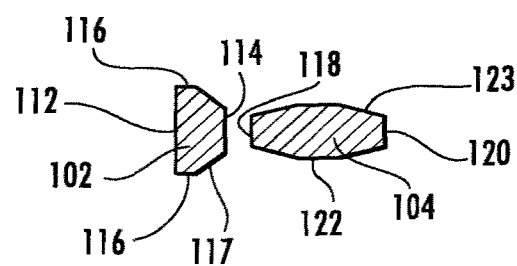
FIG. 1B is a cross-sectional top view of a bluff body and detector wing viewed along line 1B-1B of FIG. 1A.
Figure 3:
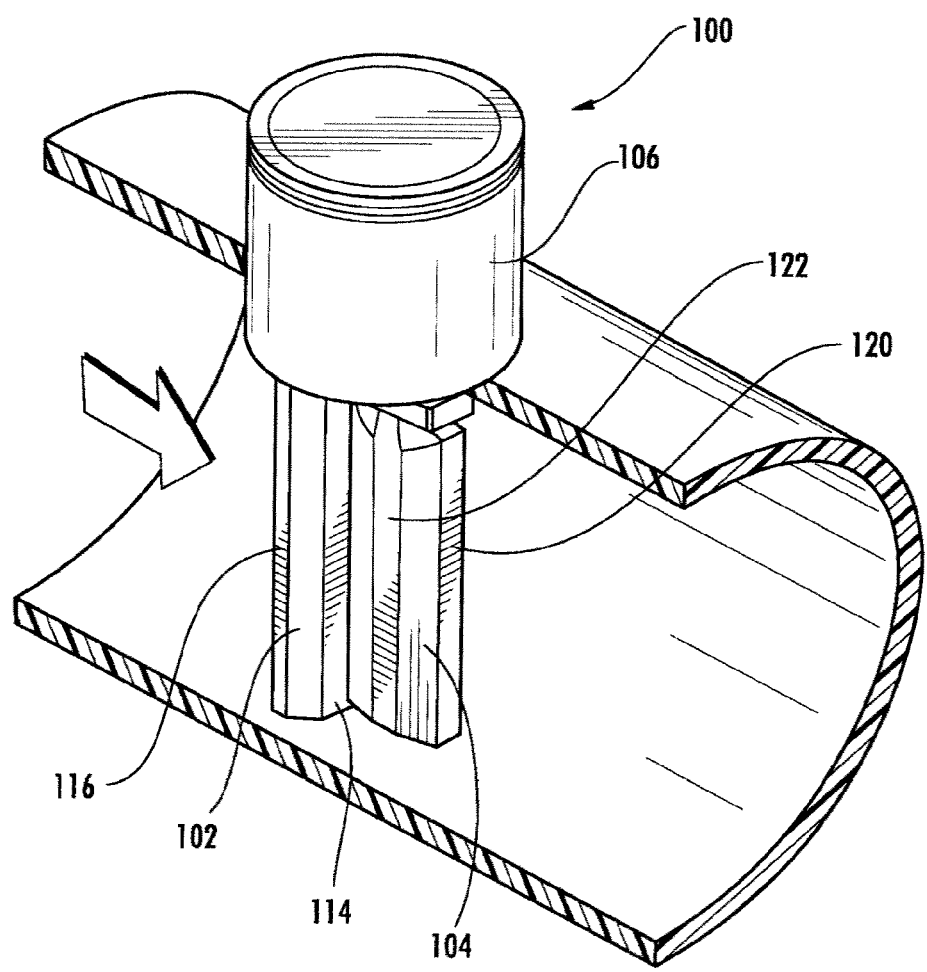
FIG. 3 is a perspective view of a vortex shedding flow meter in accordance with an embodiment of the present invention fitted within a cross-section of a pipe.

To further increase the efficacy of vortex shedding flow meter 100, varying the size and shape of bluff body 102 and detector wing 104, along with varying their orientation with respect to one another, results in improved measurement capabilities. For example, in some embodiments and as best illustrated in FIG. 1B, bluff body 102 may be constructed as a hexagonal geometric shape. In such instances, bluff body 102 includes a first side 112 which makes initial contact with the fluid whose velocity is to be measured by vortex shedding flow meter 100. Although FIG. 1B illustrates bluff body 102 as a hexagonal geometric shape, it should be understood that bluff body 102 may be constructed with any number of sides to effectively create measurable vortices. For example, in some embodiments, bluff body 102 may include three, four, five, six, seven, eight, or more sides. Additionally, the size or width of each side may vary to increase the measuring capabilities of vortex shedding flow meter 100. For example, in some embodiments, each side may have an equal width, or in other embodiments, first side 112 of bluff body 102 may be of a greater width than any of the other sides.

In some embodiments of the present invention, such as where bluff body 102 is a hexagonal geometric shape, bluff body 102 may include a first side 112 that is between about 0.1 and 0.5 inches in width. Additionally, in such embodiments, bluff body 102 may include a second side 114, parallel to first side 112 that is between about 0.05 inches and 0.25 inches. Such embodiments of bluff body 102 may also include lateral sides 116 perpendicular to first side 112 and second side 114, which are preferably between 0.025 and 0.1 inches. The configurations of bluff body 102 described above may be of appropriate size when used in a pipe having a diameter of between about 1 and 6 inches. Such sizes may also be varied proportionally to be utilized in pipes of different diameters.

Figure 13:
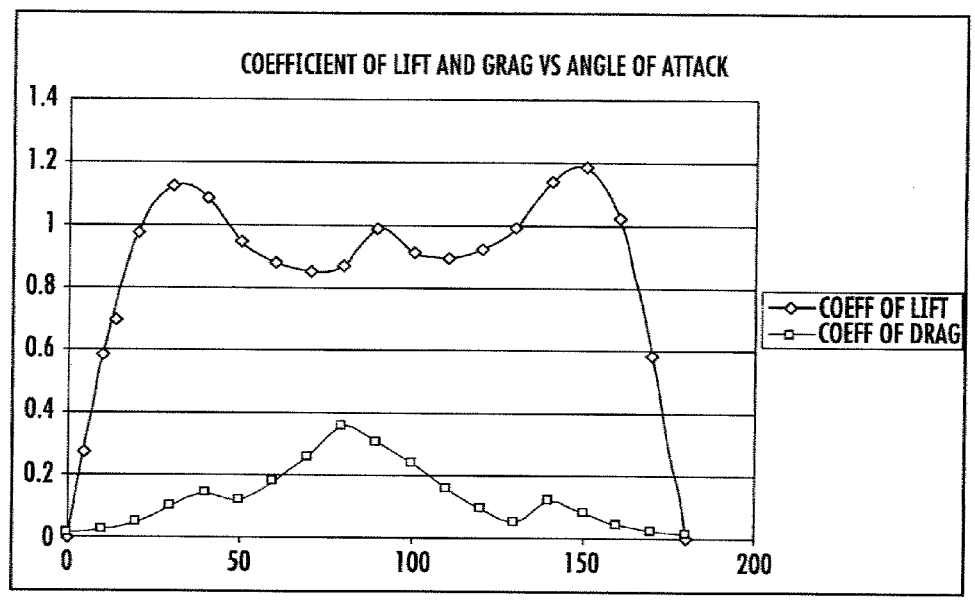
FIG. 13 is a graphical representation of the lift coefficient and drag coefficient of a detector wing of the present invention versus angles of attack as discussed in Example 2.

As also shown in FIG. 1B, in some embodiments, detector wing 104 may be constructed as an octagonal geometric shape. Such a shape produces a low drag coefficient verses a lift coefficient for a number of attack angles as shown in FIG. 13 and Example 2. It should be understood, however, that in further embodiments of the present invention, detector wing 104 could include any number of sides. For example, detector wing 104 may include three, four, five, six, seven, eight, nine, ten, or more sides. As also discussed with respect to bluff body 102, the sides of detector wing 104 may be of any suitable size to increase the measuring capabilities of vortex shedding flow meter 100. In some embodiments, each side of detector wing 104 may be of equal width, or, in further embodiments, each side of detector wing 104 may be of a different width.

In some embodiments where detector wing 104 comprises an octagonal geometric shape, detector wing 104 may include a first side 118, which is spaced apart from second side 114 of bluff body 102, which is between about 0.05 and 0.2 inches in width. Additionally, such embodiments of detector wing 104 could include a second side 120, opposite first side 118, which may also have a width between about 0.05 and 0.2 inches. The sides 122 of detector wing 104 that are perpendicular to first and second end 118, 120 may also be of a length between about 0.05 and 0.2 inches. Such embodiments may prove advantageous when placed in a pipe having a diameter between about 1 and 6 inches. Again, as is true with bluff body 102, the configurations and sizes of detector wing 104 described above may be varied proportionally based on the size of the pipe utilized.

The spacing between bluff body 102 and detector wing 104 may also be varied to provide more accurate results in measuring flow rate by vortex shedding flow meter 100. For example, in some embodiments, the distance between any portion of bluff body 102 and any portion of detector wing 104 may be between about 0.001 inch and 1 inch. In other embodiments, the distance between bluff body 102 and detector wing 104 may be between 0.01 inches and 0.5 inch. The distance between bluff body 102 and detector wing 104 should be such that the vortices created by bluff body 102 reach detector wing 104.

Referring now particularly to FIG. 2A, vortex shedding flow meter 100 includes channel 108 which may allow an operative connection between detector wing 104 and housing 106. As shown in FIG. 2B, channel 108 includes a first end 124, proximal housing 106, and a distal second end 126 located further along the length of detector wing 104. In some embodiments, a piezoelectric material 128 is placed in channel 108 adjacent second end 126. Piezoelectric material 128 produces a surface charge in response to deflections within detector wing 104 caused by vortices created by bluff body 102. This surface charge can be measured to provide the velocity of the moving fluid within the pipe. The placement of piezoelectric material 128 is done such that piezoelectric material 128 is in an area of maximum imparted strain for proper detection of all movements of detector wing 104.

Piezoelectric materials suitable for use in the present invention may include piezoelectric ceramics, such as barium titanate, lead ziconate titanate, and lead titanate, along with polymer films including polyvinylidene fluoride. Other piezoelectric materials suitable for use with the present invention may also include monocrystalline materials, including quartz, lithium niobate, potassium niobate, and lithium tantalate, among others. The preferred piezoelectric material may depend on the requirements of the application. For example, monocrystalline materials may provide better resistance to changes in temperature of the fluid to be measured, if such is the case in the user's application.

In an embodiment of the present invention, lithium niobate may be utilized as piezoelectric material 128. It has been found that lithium niobate has an advantageous piezoelectric constant $d_{33}$, which increases the sensitivity of the piezoelectric material in detecting strain. In further embodiments of the present invention, the piezoelectric material 120 may be a "Y-cut" lithium niobate crystal. The coordinate system used to describe the physical tensor properties of lithium niobate is neither hexagonal nor rhombohedral but rather a Cartesian XYZ system. The accepted conventional coordinate system can be chosen as follows: the Z-axis is along the c-axis (i.e. the spontaneous polarization direction), the X-axis is perpendicular to the mirror plane and the Y-axis is chosen to form a right-hand system. Thus, the Y-axis must lie in a plane of mirror symmetry. Based on the lithium niobate's coordinate system, a "Y-cut" lithium niobate crystal is one that is cut perpendicular to the Y-axis.

Such a crystal is produced by cutting perpendicular to the crystal's Y-axis providing it with a "Y"-crystallographic orientation. A Y-cut lithium niobate crystal avoids pyroelectric effects (typically present in Z-axis oriented crystals), while still utilizing an advantageous piezoelectric sensitivity. In some embodiments, the "Y-cut" lithium niobate crystal of the present invention allows for the crystal to have a continuous operating range up to 450° C. and is immune to thermal shock below 100° C./s. When a Y-cut lithium niobate crystal is utilized in the present invention, in some embodiments, the crystal is placed within channel 108 such that its Y-axis is perpendicular to the deflection of the wing.

Prior to insertion within channel 108, in some embodiments, piezoelectric material 128 may be fitted between two spacers 130 as shown in FIGS. 4A through 4D. Spacers 130 may serve to properly hold piezoelectric material 128 within channel 108. Spacers 130 for use in the present invention may be constructed of any suitable material in the art capable of properly securing piezoelectric material 128 while vortex shedding flow meter 100 is in use. For example, forsteire ceramics may be used due to their acceptable thermal expansion coefficient. The needs of a particular application, however, may dictate the appropriate material of spacers 130.

Figure 4A:
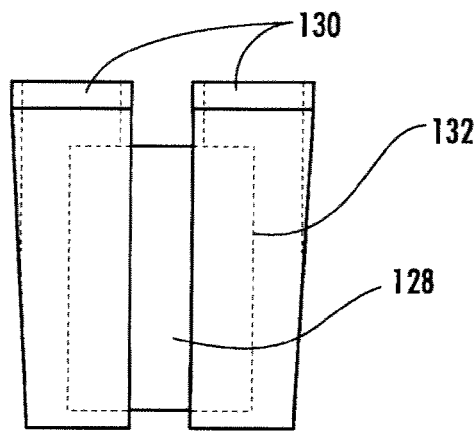
FIG. 4A is a partially transparent, side view of spacers fitted over piezoelectric material in accordance with an embodiment of the present invention.
Figure 4B:
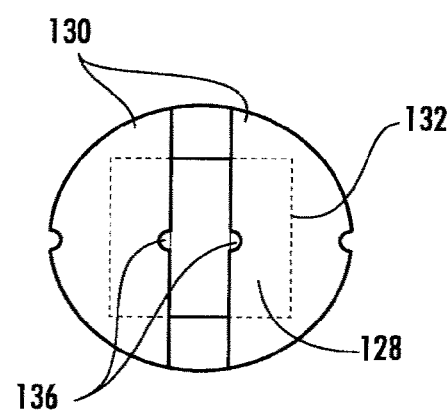
FIG. 4B is a partially-transparent, top view of the spacers illustrated in FIG. 4A.
Figure 4C:
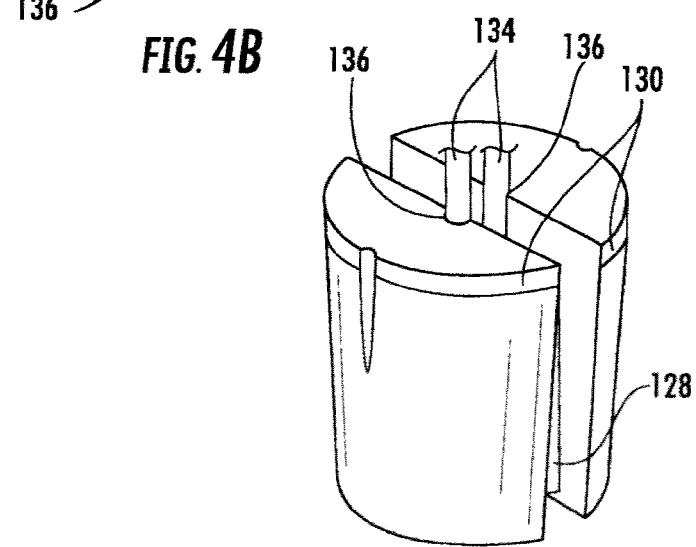
FIG. 4C is a perspective view of the spacers illustrated in FIG. 4A.
Figure 4D:
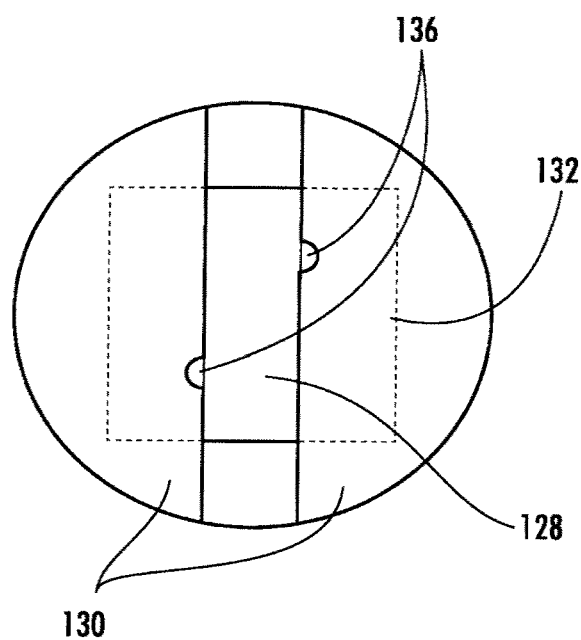
FIG. 4D is a partially transparent, top view of spacers fitted over piezoelectric material in accordance with an additional embodiment of the present invention.

In this embodiment, within spacers 130 is a metal zed layer 132 that makes direct contact with piezoelectric material 128. In some embodiments, metalized layer 132 may be constructed of silver or silver palladium. Metalized layer 132 of spacers 130 may also include wire electrodes 134 that are fused to metalized layer 132. Such electrodes 134 may be made of any appropriate metal material, including, in some embodiments, silver. The metalized layers 132, electrodes 134 and the piezoelectric material 128 act together to create a capacitor to relay the charge produced to housing 106 for determination of the flow rate. Spacers 130 may further define electrode notches 136 for proper placement of electrodes 134. Electrode notches 136 may be located to oppose one another, as shown in FIG. 4A, may be offset as illustrated in FIG. 4D. By providing offset electrode notches, a user may avoid the risk of contact between electrodes which could lead to shorting.

Piezoelectric material 128 may fit securely within spacers 130. In some embodiments, however, a material, for example, potting compound, may provide a strain relief at a point of contact between spacers 130 and piezoelectric material 128. The potting compound may also make contact with electrodes 134 and aid in maintaining their placement.

Once piezoelectric material 128 is properly situated within spacers 130, spacers 130 may be placed within channel 108. In some embodiments, and as shown in FIGS. 2A and 2B, spacers 130 and channel 108 may be slightly tapered. Such tapering may allow the walls of channel 108 to force spacers 130 together, so that spacers 130 and piezoelectric material 128 will press fit in channel 108 to maintain a secure connection.

Spacers 130 and channel 108 may include a high surface finish. For example, in some embodiments, spacers 130 and channel 108 may have a surface finish between about 0.1 and 2.0 μm. In further embodiments, spacers 130 and channel 108 may have a surface finish between about 0.2 and 0.8 μm. Such a surface finish may be necessary to avoid any unnecessary stress on spacers 130 while situated within channel 108. If such stresses are present and reach an undesirable level, spacers 130 may fail structurally as they are moved into channel 108.

After spacers 130 are properly placed within channel 108, mechanical force may be applied to spacers 130 (which carry piezoelectric material 128) to secure them in position. In some embodiments, and as illustrated in FIG. 2B, this may be accomplished using a screw 138 and a stressing ring 140. In such embodiments, a portion of channel 108 may be threaded such that screw 138 will move downward as it is rotated and come in contact with stressing ring 140. Stressing ring 140 may provide sufficient force to spacers 130 to maintain the proper placement of piezoelectric material 128. If a screw is utilized, it may be equipped with a through hole 142 such that electrodes 134 may pass to housing 106.

Once electrodes 134 have been extended to housing 106, devices (not shown) within (or external to) housing 106 may detect the charge transmitted by electrodes 134 to determine a flow rate. For example, in some embodiments, electrodes 134 pass to housing 106, which includes a charge amplifier and an analog to digital converter. A signal processor may be utilized to determine the frequency of the vortices. This frequency may be converted to and outputted as a flow rate.

FIGS. 5-11 illustrate vortex shedding flow meter 100*a* in accordance with an additional embodiment of the present invention. As shown, flow meter 100*a* includes a shroud 110*a* which may aid in producing proper vortices in pipes of larger diameters, for example, pipes having a diameter between about 1 inch and 80 inches. The shroud 110*a* may increase the signal to noise ratio and protect the measured vortices from surrounding noise in the flow pipe.

Figure 12A:
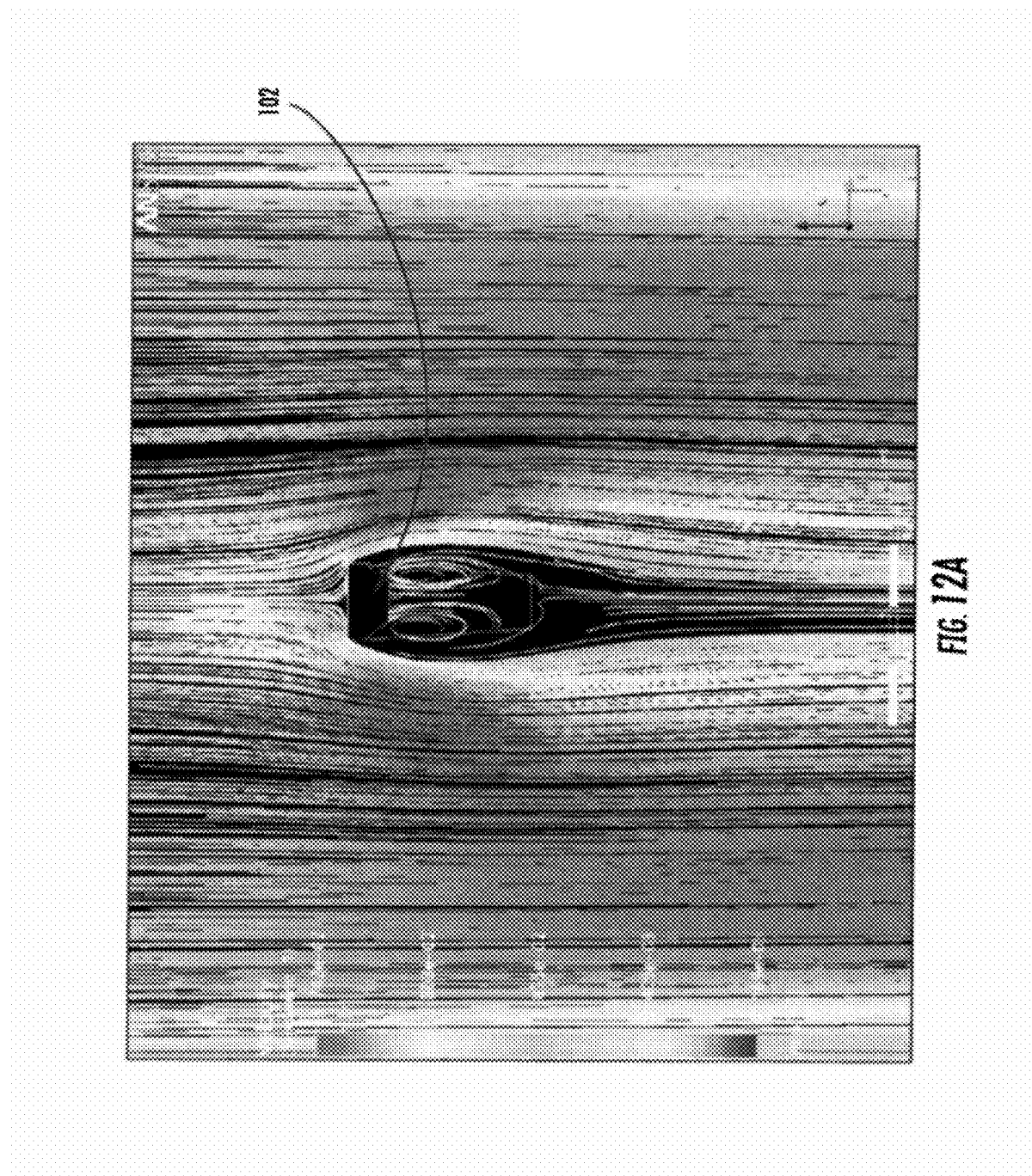
FIG. 12A is a computational fluid dynamics model of a vortex shedding flow meter in accordance with a first embodiment of the present invention where water is passed at 0.1 ft/sec.

In such embodiments, however, shroud 110*a* does not include an obstruction at the upstream end of the shroud such as shroud lip 144*a* as shown in FIG. 12I. It has been found that such obstructions too often create secondary vortices that are detected by the detector wing and are not indicative of the vortices created by the bluff body. The impact on the efficacy of a vortex shedding flow meter when used with a shroud having such an obstruction 144*a* can best be seen in FIGS. 12A through 12I. In some instances, as best illustrated in FIG. 12I, the obstruction 144*a* of shroud 110*a* influences the ability of a bluff body to create any vortices, and often, leaves only laminar flow within the shroud. The obstruction 144*a* produces vortices around the outside of the shroud, which are outside of the detector area and, therefore, unreadable. The only readable vortices read by the bluff body are secondary effects from the obstruction 144*a* of the shroud 110*a*, which may be unreliable. Accordingly, the absence of obstructions on the shroud, as shown in the FIGS. 12A-12H, allows the detector wing 104*a* to more properly detect the vortices produced by bluff body 102*a* and not to be influenced by secondary flow turbulence profiles.

The embodiment illustrated in FIGS. 5-11 generally includes a bluff body 102*a* and a detector wing 104*a* which are sized in a similar manner as the bluff body and detector wing described above. In addition, the detector wing 104*a* is situated in a similar place on the housing 106*a* as described above. The bluff body 102*a*, however, as shown in FIG. 5, may extend vertically inside the opening of shroud 110*a* rather than being cantilevered from the housing 106*a*. In such embodiments, the bluff body 102*a* may extend the entire inner diameter of the shroud 110*a*, or in additional embodiments, the bluff body 102*a* may only extend a portion of the diameter of the shroud 110*a*.

Figure 6:
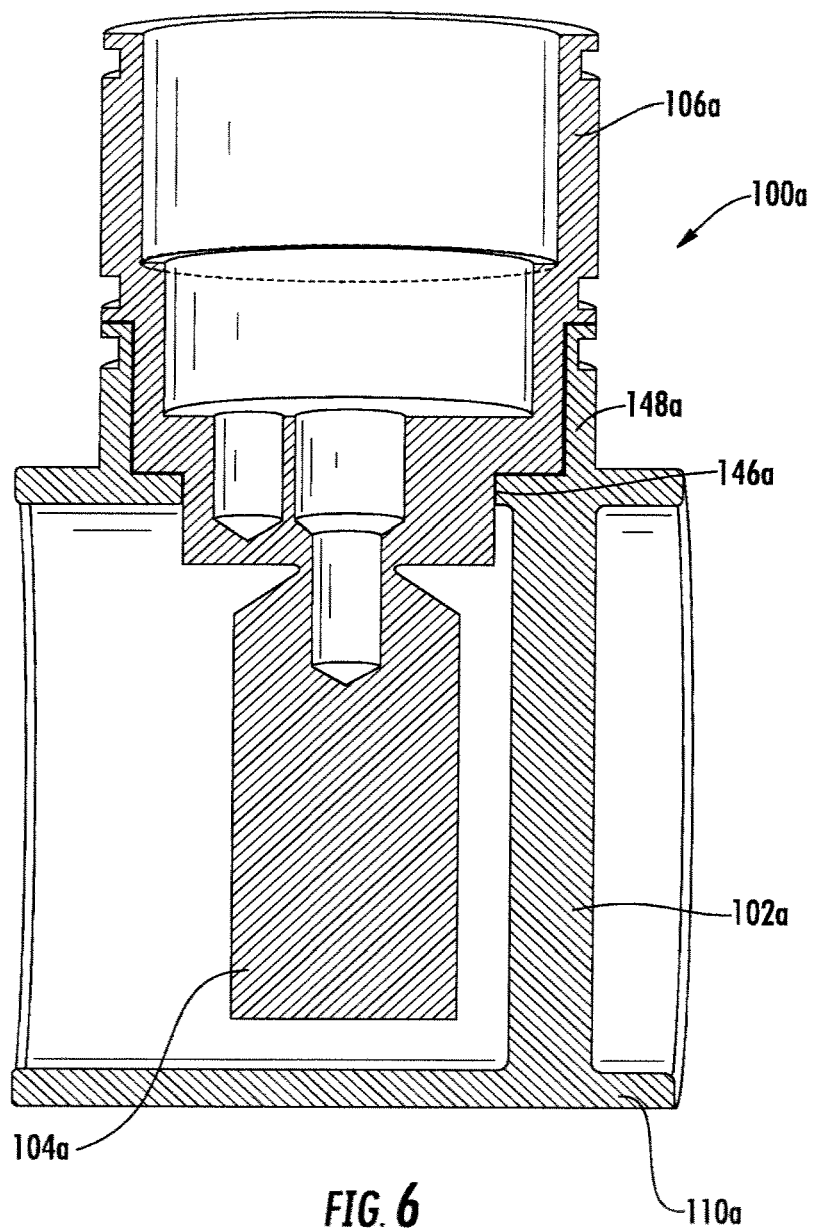
FIG. 6 is a partial cross-sectional view of the vortex shedding flow meter within a shroud of FIG. 5.

Vortex shedding flow meter 100*a*, as shown in FIGS. 5 and 6, may be placed within an aperture 146*a* defined in shroud 110*a*. In such embodiments, the shroud 110*a* may also include an arcuate structure(s) 148*a* that fully or partially surrounds the housing 106*a* and in which housing 106*a* is seated to ensure a secure fit of the vortex shedding flow meter 100*a* within the shroud 110*a*. Such a configuration may be utilized with the earlier described embodiment as well when the vortex shedding flow meter 100 is placed within a larger pipe or tube.

In this embodiment, vortex shedding flow meter 100*a* may also include a temperature sensor 150*a* as shown in FIG. 5. The temperature sensor 150*a* may be placed within the housing 106*a*, which includes a temperature sensor channel 152*a*. The temperature sensor channel 152*a* may allow for the proper placement of the temperature sensor 150*a*, and may be filled with potting compound once the temperature sensor 150*a* is in place. The temperature sensor 150*a* may also include an electrode 154*a* or series of electrodes that can communicate the measured temperature to a display device. The temperature sensor 150*a*, in some embodiments, may be a resistance temperature detector and may include carbon resistors, film thermometers, wire wound thermometers, coil elements, or other types of suitable temperature detectors known in the art. The specific application of the vortex shedding flow meter 100*a* may dictate the particular temperature sensor utilized.

Figure 7:
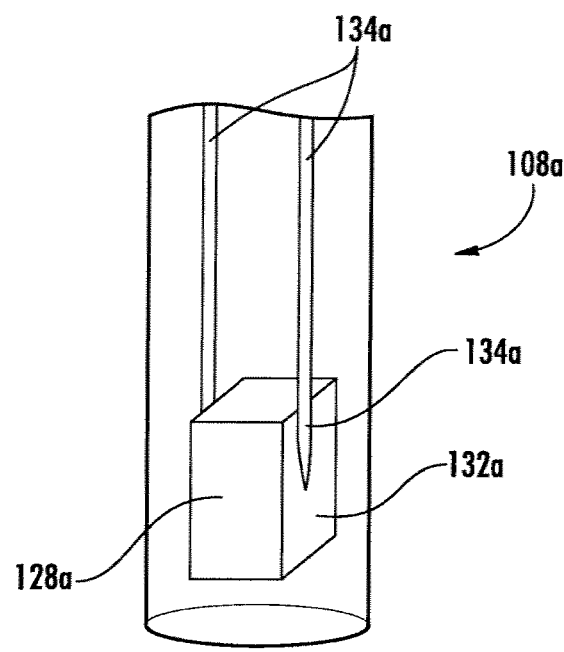
FIG. 7 is a transparent, side view of a channel fitted with piezoelectric material in accordance with the embodiment illustrated in FIG. 5.

In the embodiment illustrated in FIG. 5, the piezoelectric material 128*a* is not situated within spacers, but instead is inserted into channel 108*a*, which is then filled with ceramic potting compound. In such embodiments, as shown in FIG. 7, piezoelectric material 128*a* may be equipped with metalized layers 132*a* on opposing sides of piezoelectric material 128*a*, which are fused with electrodes 134*a*. As discussed above, metalized layers 132*a* and electrodes 134*a* may be made of any appropriate metal, for example, silver or silver palladium.

In some embodiments, and as illustrated in FIG. 5, the electrodes 134*a* may pass through a ceramic insulator 156*a* that includes respective passages 158*a* for each electrode 134*a*. Such construction may allow for the passing of the electrodes 134*a* through the housing 106*a* without having them come in contact with one another. Although the embodiment is described with a ceramic insulator, it should be noted that other insulators may also prove useful and may be utilized with additional embodiments of the present invention.

Figure 8:
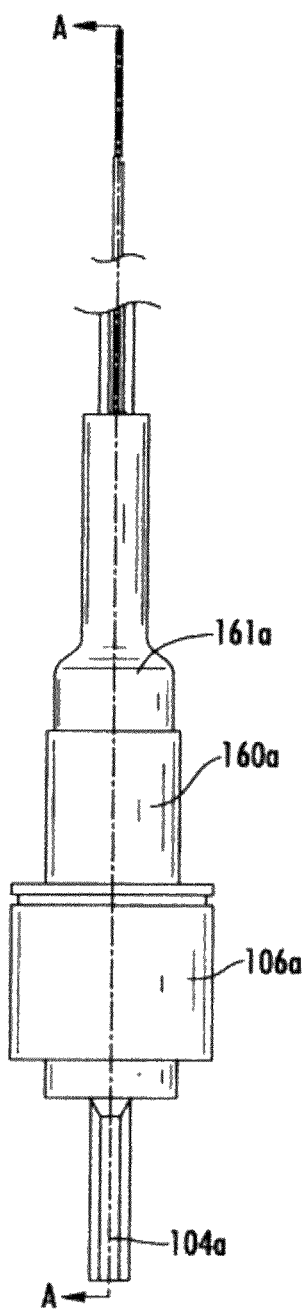
FIG. 8 is a front view of the vortex shedding flow meter illustrated in FIG. 5 with the shroud removed.
Figure 9:
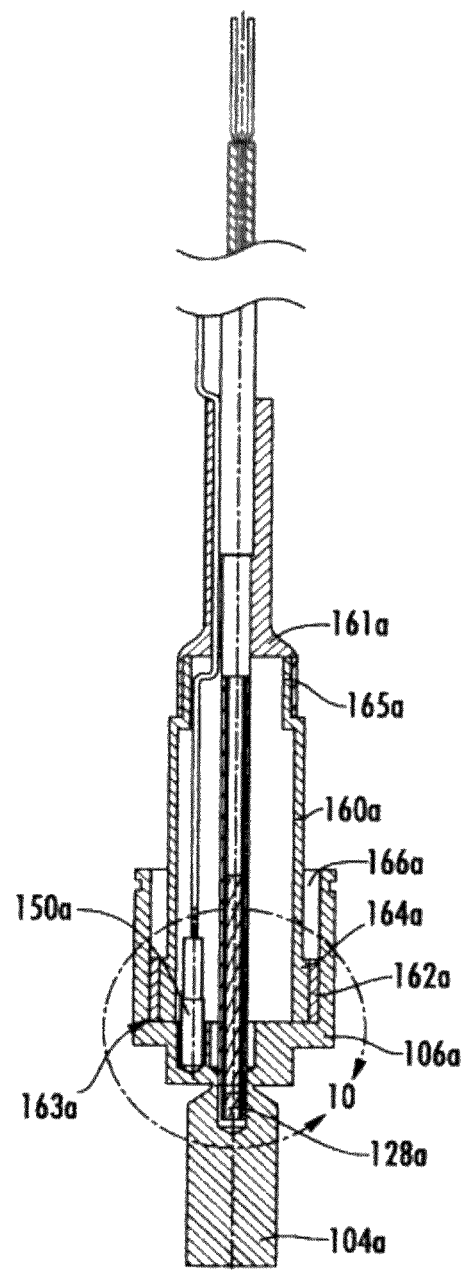
FIG. 9 is a cross-sectional view taken along line A-A of FIG. 8.
Figure 10:
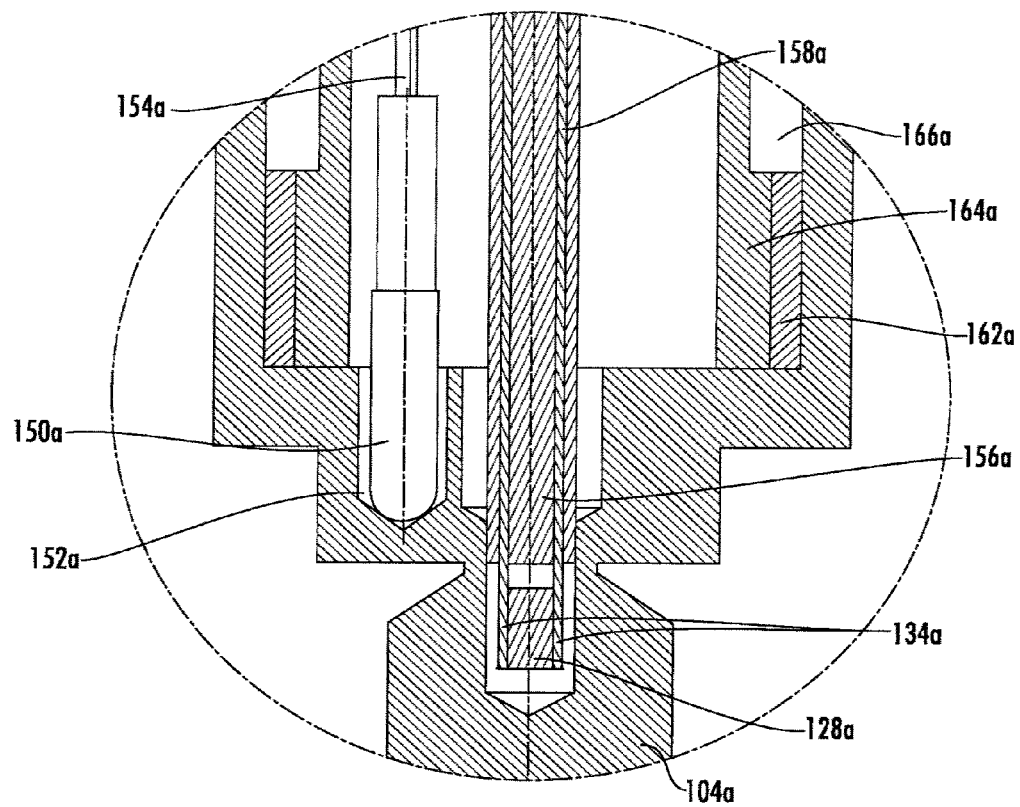
FIG. 10 is an enlarged view of the portion indicated by circle 10 in FIG. 9.

In embodiments where a shroud is utilized and as shown in FIGS. 8-10, the housing 106*a* may include an extension 160*a* and neck 161*a* to cover the piezoelectric material electrodes 134*a* and the temperature sensor electrodes 154*a* so they are not damaged as they extend outside of the shroud 110*a* to an outer surface of the larger pipe or tube. As shown in FIGS. 9 and 10, the housing 106*a* includes a threaded portion 162*a* defining inner threads to engage outer threads on a threaded portion 164*a* at a first end 163*a* of extension 160*a*. In additional embodiments, the extension 160*a* may be secured within the housing with the use of an adhesive rather than with treaded portions. Once the extension is properly in place, a stop 166*a* may be installed above the treaded portions 162*a* and 164*a* to prevent the fluid within the tube from entering the housing 106*a*. For example, in some embodiments, a heat shrink tube may serve as the stop 166*a* within the housing 106*a*. The neck 161*a*, as shown in FIG. 9, may be placed over a second end 165*a* of the extension 160*a* and secured with, in some embodiments, welding or adhesives. The neck 161*a* is of a suitable diameter such that the exit passage (not shown) of the larger pipe or tube may be relatively small and may still accommodate the neck 161*a* of the vortex shedding flow meter 100*a*.

Figure 11:
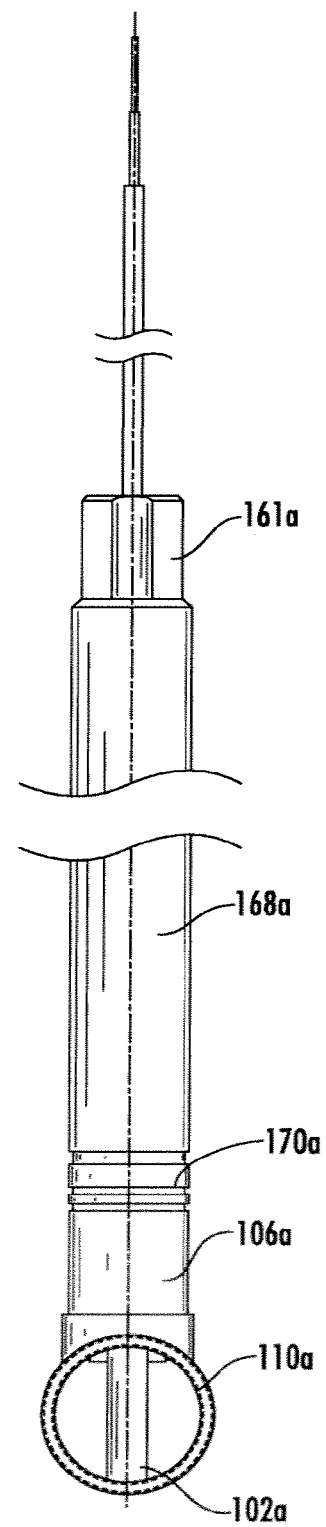
FIG. 11 is a front view of the vortex shedding flow meter of FIG. 8 with a cover.

In embodiments with an extension, the vortex shedding flow meter 100*a* may also include a cover 168*a* to enclose the extension 160*a* as shown in FIG. 11. The cover 168*a* provides an additional barrier between the fluid within the pipe (tube) and the electrodes that extend from the housing 106*a* and out of the pipe. In such embodiments, the cover 168*a* could include a recessed end 170*a* that is suitable to fit within the housing 106*a* and the stop 166*a*. The cover 168*a* can be welded into the housing 106*a* to ensure that no additional fluid is allowed to seep into the housing 106*a*. The cover 168*a* may be constructed of any metal or other appropriate material that is suitable to protect the electrodes 134*a* and 154*a* from the fluid that is passing through the pipe. For example, in some embodiments, the cover 168*a* may be constructed of a stainless steel or other type of metal.

The following examples describe various embodiments of the present invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples.

EXAMPLES

Example 1

An improved vortex shedding flow meter of the present invention was constructed and tested for efficiency in determining flow rates. The shape of the bluff body and the detector wing of the vortex shedding flow meter used for testing is illustrated in FIG. 1B. The bluff body and detector wing were further sized in accordance with Table 1 shown below.

TABLE 1

Dimensions of experimental bluff body and detector wing

| Number Designation (from FIG. 1B) | Length (in) |
|---|---|
| 112 | 0.250 |
| 114 | 0.125 |
| 116 | 0.050 |
| 117 | 0.098 |
| 118 | 0.100 |
| 120 | 0.100 |
| 122 | 0.100 |
| 123 | 0.121 |

Distance between 114 and 118: 0.081 inches

Example 2

The drag coefficient and lift coefficient of the improved detector wing described in Example 1 were tested against a wide range of angles of attack. From the detected drag and lift coefficients, a moment coefficient was measured. The results of the testing are shown below in Table 2 and are graphically represented in FIG. 13.

TABLE 2

Experimental results of testing drag coefficient and lift coefficient

| Angle of Attack | Lift Coefficient | Drag Coefficient | Moment Coefficient |
|---|---|---|---|
| 0 | 0 | 0.0141 | 0 |
| 10 | 0.586 | 0.0224 | 0.037 |
| 20 | 0.973 | 0.0498 | 0.055 |
| 30 | 1.124 | 0.1007 | 0.072 |
| 40 | 1.085 | 0.1447 | 0.086 |
| 50 | 0.946 | 0.1197 | 0.057 |
| 60 | 0.877 | 0.1828 | 0.05 |
| 70 | 0.852 | 0.26 | 0.037 |
| 80 | 0.87 | 0.3595 | 0.02 |
| 90 | 0.989 | 0.3061 | 0 |
| 100 | 0.913 | 0.2369 | −0.02 |
| 110 | 0.893 | 0.157 | −0.037 |
| 120 | 0.92 | 0.0969 | −0.05 |
| 130 | 0.992 | 0.0525 | −0.057 |
| 140 | 1.138 | 0.118 | −0.086 |
| 150 | 1.187 | 0.0794 | −0.072 |
| 160 | 1.023 | 0.0407 | −0.055 |
| 170 | 0.585 | 0.023 | −0.037 |
| 180 | 0 | 0.0141 | 0 |

As indicated from Table 2 and FIG. 13, the design of the detector wing of Example 1 minimizes the drag coefficient over the lift coefficient over a wide range of angles of attack. Such design maximizes the sensitivity to vortex generation created by the bluff body.

Example 3

Figure 12B:
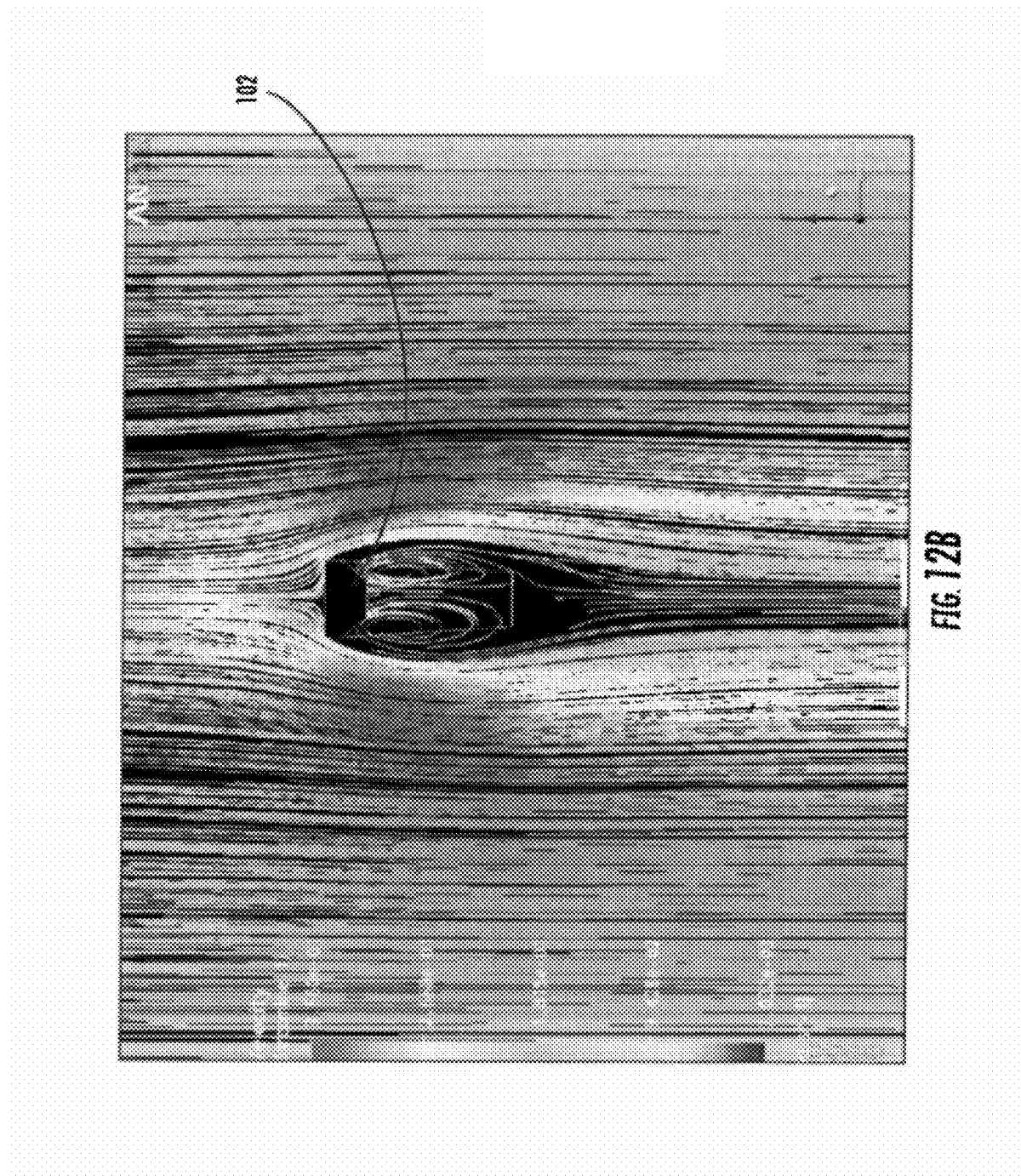
FIG. 12B is a computational fluid dynamics model of a vortex shedding flow meter in accordance with a first embodiment of the present invention where water is passed at 1.0 ft/sec.
Figure 12C:
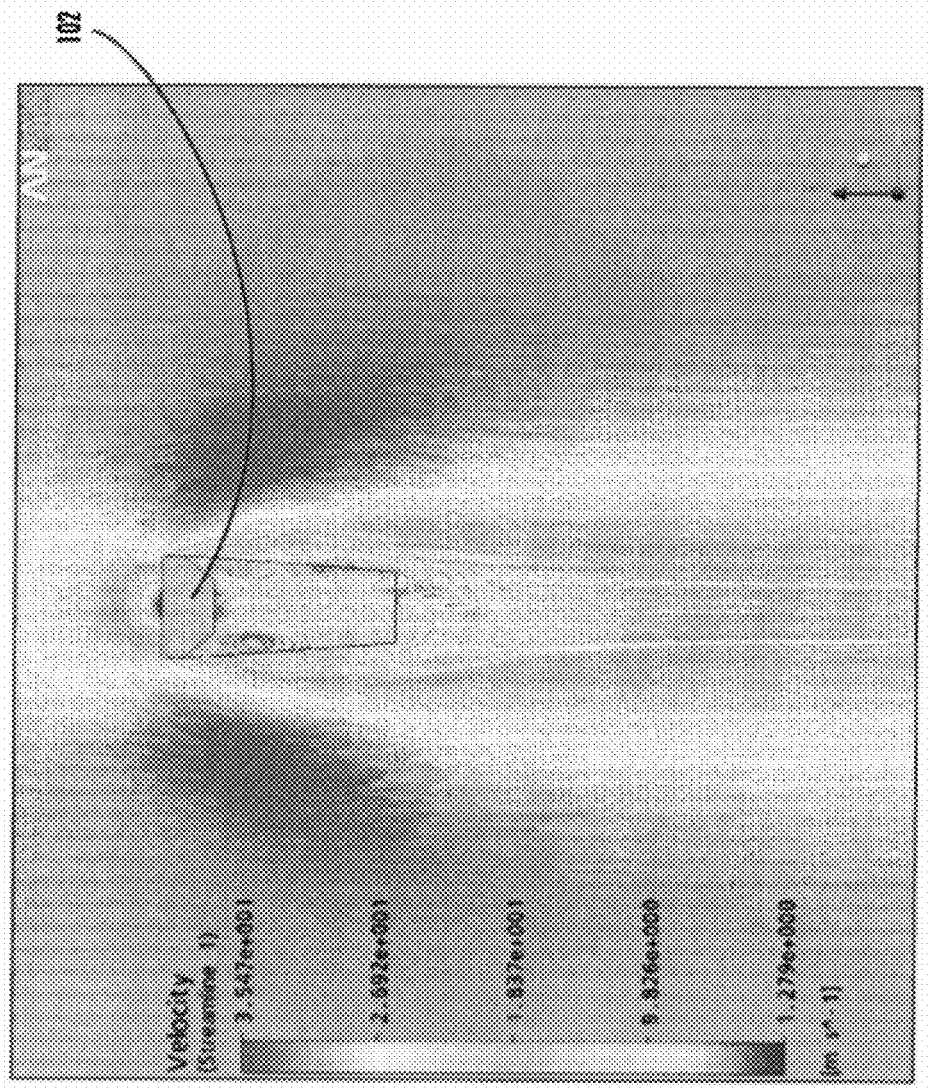
FIG. 12C is a computational fluid dynamics model of a vortex shedding flow meter in accordance with a first embodiment of the present invention where water is passed at 10 ft/sec.
Figure 12E:
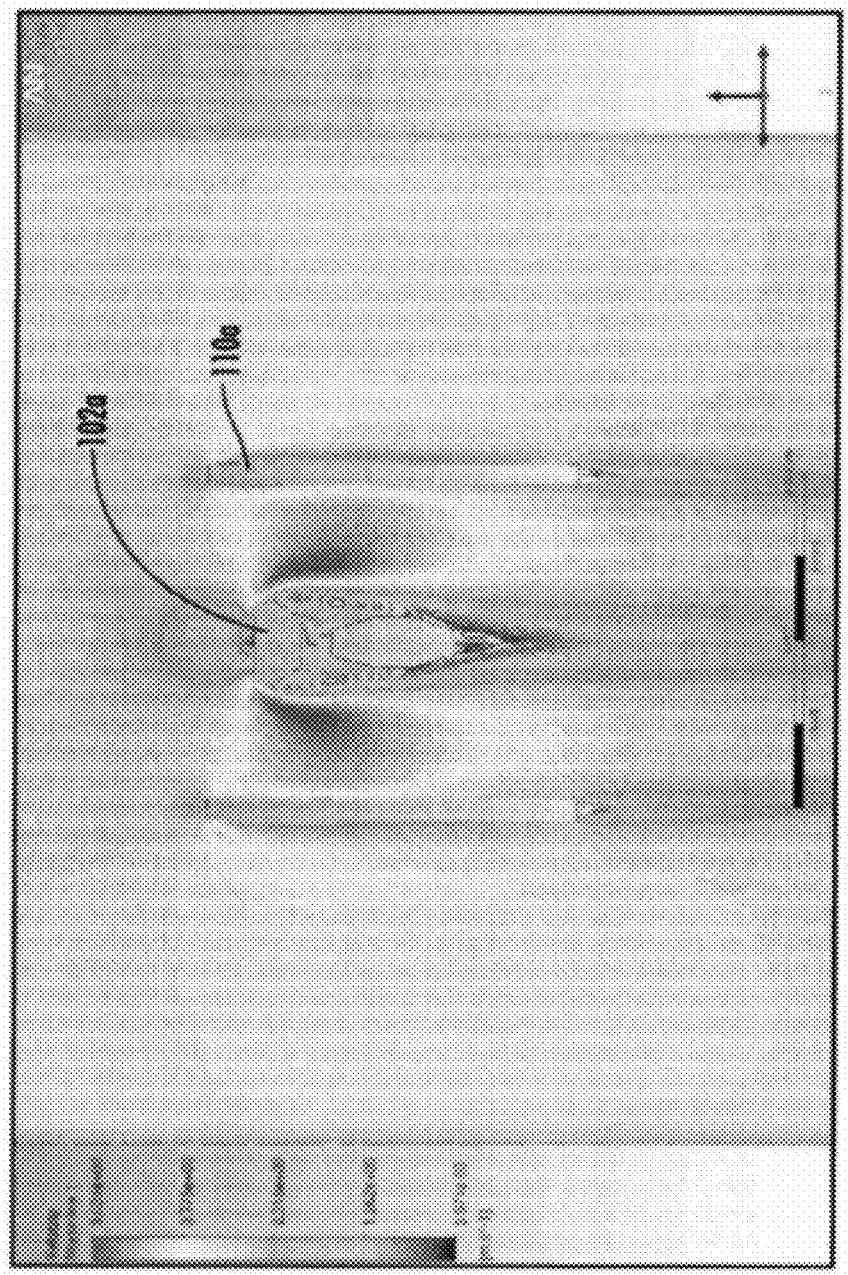
FIG. 12E is a computational fluid dynamics model of a vortex shedding flow meter in accordance with a second embodiment of the present invention where water is passed at 10 ft/sec.
Figure 12F:
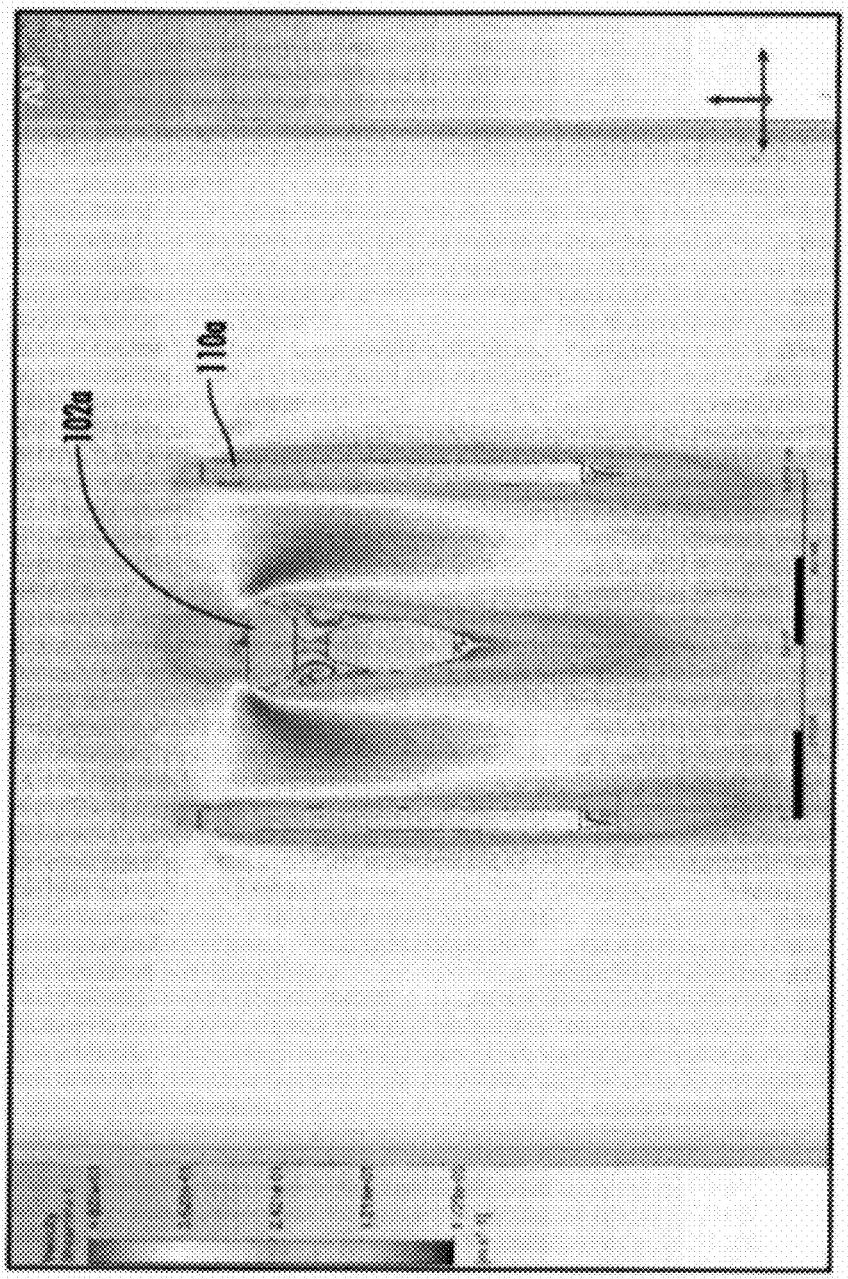
FIG. 12F is a computational fluid dynamics model of a vortex shedding flow meter in accordance with a second embodiment of the present invention where water is passed at 1 ft/sec.
Figure 12G:
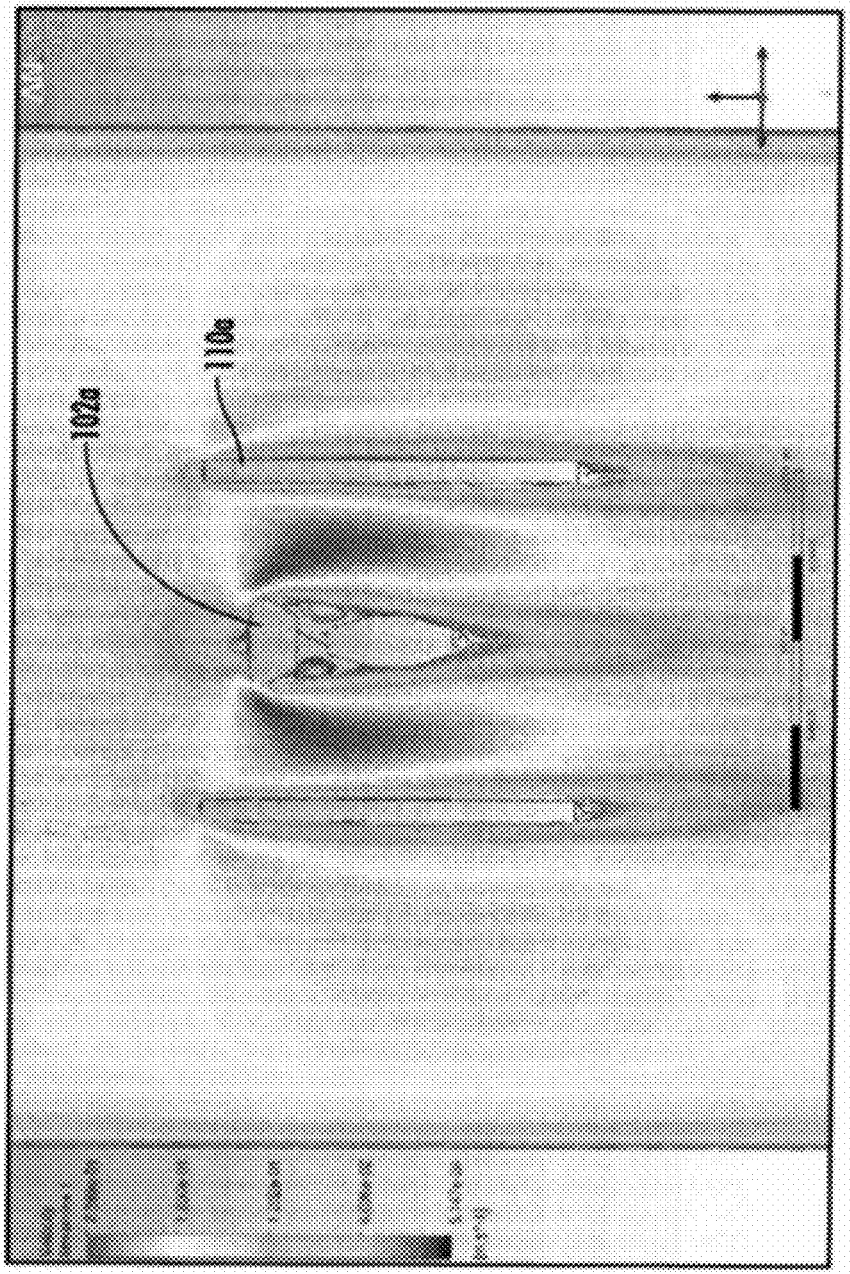
FIG. 12G is a computational fluid dynamics model of a vortex shedding flow meter in accordance with a second embodiment of the present invention where water is passed at 0.5 ft/sec.

The improved vortex shedding flow meter of Example 1 was properly fitted in a 3 inch diameter PVC pipe with water as the measuring fluid. Water, with a viscosity of 8.90 E-04 Pa·s, was then passed through the pipe at various velocities to measure the Reynolds number which resulted from the varying velocities. A visual representation of each trial is shown in FIGS. 12A through 12C.

TABLE 3

Experimental results relating to changes in velocity

| Trial FIG. | Velocity Ft/s | Velocity m/s | Calculated Reynolds Number | Measured Reynolds Number |
|---|---|---|---|---|
| 12A | 0.1 | 0.03048 | 2.61E+03 | 3.0238E+03 |
| 12B | 1 | 0.3048 | 2.61E+04 | 3.0238E+04 |
| 12C | 10 | 3.048 | 2.61E+05 | 3.0238E+05 |

By utilizing an embodiment of the present invention, the vortex shedding flow meter, first, provides proper vortices for measurement as shown in the above-referenced figures. Additionally, the embodiment of the present invention results in consistent measurements to produce accurate readings of the fluid flow rate in the pipe.

Example 4

The improved vortex shedding flow meter of having a bluff body and detector wing sized in accordance with the embodiment illustrated in Example 1 was properly fitted with a shroud having an inner diameter of 1.063 inches and a pipe with an inner diameter of 3.063 inches. Water, with a viscosity of 8.90 E-04 Pa·s, was then passed through the pipe at various velocities to measure the Reynolds number which resulted from the varying velocities. A visual representation of each trial is shown in FIGS. 12D through 12H.

TABLE 4

Experimental results relating to changes in velocity

| Trial FIG. | Velocity Ft/s | Velocity m/s | Calculated Reynolds Number | Measured Reynolds Number |
|---|---|---|---|---|
| 12D | 5 | 1.524 | 1.248E+05 | 1.248E+05 |
| 12E | 10 | 3.048 | 2.497E+05 | 2.497E+05 |
| 12F | 1 | 0.3048 | 2.497E+04 | 2.497E+04 |
| 12G | 0.5 | 0.1524 | 1.248E+04 | 1.248E+04 |
| 12H | 0.1 | 0.03048 | 2.496E+03 | 2.496E+03 |

By utilizing an embodiment of the present invention, the vortex shedding flow meter, first, provides proper vortices for measurement as shown in the above-referenced figures. Additionally, the embodiment of the present invention results in consistent measurements to produce accurate readings of the fluid flow rate in the pipe.

Example 5

The embodiment of the present invention discussed in Example 1 was tested to determine whether the pressure variation from the vortices created by the bluff body could be sensed by the detector wing and translated into charge from a piezoelectric material located within a channel as shown in FIG. 2. The piezoelectric material's surface area was measured at 4.00 E-06 m$^2$. The results of the test are shown in Table 5 and are graphically represented in FIG. 14.

TABLE 5

Measured stress and charge of invention at varying velocities

| Velocity (ft/sec) | Stress (Pa) | Force (N) | Charge (pC) |
|---|---|---|---|
| 2 | 5210 | 2.08E−02 | 0.129 |
| 4 | 21219 | 8.49E−02 | 0.526 |
| 6 | 49024 | 1.96E−01 | 1.216 |
| 8 | 86441 | 3.46E−01 | 2.144 |
| 10 | 1.34E+05 | 5.37E−01 | 3.330 |
| 12 | 1.94E+05 | 7.75E−01 | 4.803 |

Figure 14:
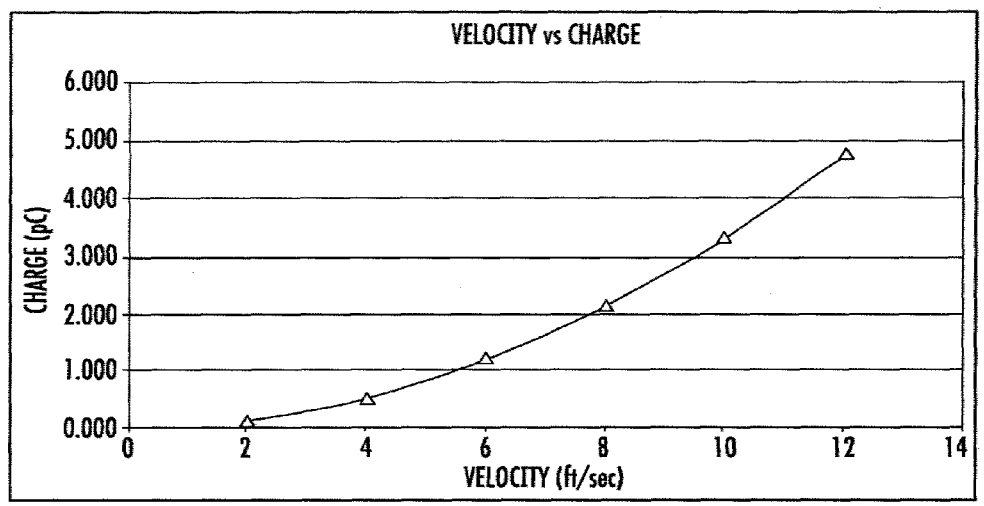
FIG. 14 is a graphical representation of the charge produced by a piezoelectric material in response to changes in velocity while positioned in a vortex shedding flow meter of the present invention, as discussed in Example 5.

As shown from the graphical representation in FIG. 14, the plot of velocity of flow versus the charge produced by the piezoelectric material shows quadratic behavior. These results are desired, as a specified increase in velocity produces a consistent increase in the charge obtained by the piezoelectric material. Again, these results indicate the improved measuring capabilities of vortex shedding flow meters of the present invention.

All references cited in this specification, including without limitation, all papers, publications, patents, patent applications, presentations, texts, reports, manuscripts, brochures, books, internet postings, journal articles, and/or periodicals are hereby incorporated by reference into this specification in their entireties. The discussion of the references herein is intended merely to summarize the assertions made by their authors and no admission is made that any reference constitutes prior art. The right to challenge the accuracy and pertinence of the cited references is reserved.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and is not intended to limit the invention so further described in such appended claims. Therefore, the spirit and scope of the appended claims should not be limited to the description of the versions contained therein.

What is claimed is:

1. A vortex shedding flow meter comprising:
   a. a housing;
   b. a hexagonal bluff body having a first side that makes initial contact with the flow of a fluid, the first side having a width at least two times the width of an opposite, parallel second side and at least five times the width of two adjacent perpendicular third sides; and
   c. an octagonal detector wing oriented in a cantilever manner from the housing and spaced apart from the bluff body so as to be downstream in relation to the flow of fluid, the detector wing having a first side proximate the bluff body and having a width substantially equal to the width of an opposite parallel second side and substantially equal to the width of two perpendicular third sides.

2. The vortex shedding flow meter of claim 1, wherein the detector wing further defines a channel within the wing, wherein the channel further includes:
   i. a Y-cut lithium niobate crystal to sense deflections of the detector wing; and
   ii. a pair of electrodes that make contact to the Y-cut lithium niobate crystal and extend through the channel to the housing.

3. The vortex shedding flow meter of claim 2, wherein the Y-cut lithium niobate crystal is positioned such that its Y-axis is perpendicular to the deflection of the detector wing.

4. The vortex shedding flow meter of claim 1, wherein the vortex shedding flow meter further includes a shroud that surrounds at least a portion of the detector wing and the bluff body.

\* \* \* \* \*